United States Patent [19]

Wada et al.

[11] Patent Number: 4,801,334
[45] Date of Patent: Jan. 31, 1989

[54] METHOD OF AND APPARATUS FOR CLEANING MAGNETIC RECORDING DISK CARTRIDGE

[75] Inventors: Toshihiko Wada, Tokyo; Hideki Matsuzawa, Kanagawa, both of Japan

[73] Assignee: Fuji Photo Film Co., Ltd., Kanagawa, Japan

[21] Appl. No.: 51,352

[22] Filed: May 19, 1987

[30] Foreign Application Priority Data

May 19, 1986 [JP] Japan ............................. 61-114370

[51] Int. Cl.⁴ .................................................. B08B 5/04
[52] U.S. Cl. .................................... 134/21; 134/25.4; 134/33; 15/104.8; 15/302; 15/DIG. 14; 15/303; 15/300 R

[58] Field of Search ................. 134/21, 22.11, 22.12, 134/25.4, 33; 15/104, 8, 302, DIG. 14, 303, 300 R, 301, 322, 330, 351, 358; 369/74

[56] References Cited

U.S. PATENT DOCUMENTS

| 3,218,082 | 11/1965 | Taylor et al. | 15/300 R |
| 3,479,222 | 11/1969 | David et al. | 15/302 |
| 3,659,526 | 5/1972 | Staller | 15/301 |
| 4,479,281 | 10/1984 | Mikutowski | 15/303 |
| 4,675,053 | 6/1987 | McCarty et al. | 15/302 |

Primary Examiner—H. M. S. Sneed
Assistant Examiner—Sharon T. Cohen
Attorney, Agent, or Firm—Sughrue, Mion, Zinn, Macpeak, and Seas

[57] ABSTRACT

A magnetic recording disk accommodated in a casing is rotated and air in the casing is drawn through air sucking openings formed in the upper and lower sides of the casing.

4 Claims, 1 Drawing Sheet

METHOD OF AND APPARATUS FOR CLEANING MAGNETIC RECORDING DISK CARTRIDGE

BACKGROUND OF THE INVENTION

1. Field of the Invention

This invention relates to a method of clearing a magnetic recording disk cartridge of dust adhering to the magnetic recording disk surface in the course of manufacture of the magnetic recording disk cartridge, and to an apparatus for carrying out the method.

2. Description of the Prior Art

A magnetic recording disk cartridge generally comprises a thin casing and a magnetic recording disk accommodated therein for rotation. A liner generally made of non-woven fabric is applied to each inner side of the casing to sweep dust off the side of the disk while the disk is rotated.

However there has been a problem that particulate components of the liner fall on the magnetic recording disk and adhere thereto during assembly of the cartridge due to various mechanical shocks, e.g., vibration transmitted to the liner by way of the casing when upper and lower halves of the casing are welded together by ultrasonic welding. That is, the liner which is provided to sweep away dust on the disk gives dust source.

When the magnetic recording disk, bearing thereon particulate components of the liner, is subjected to recording or reproduction, the particulate components enter between the disk and the magnetic head to cause drop-out.

SUMMARY OF THE INVENTION

In view of the foregoing observations and description, the primary object of the present invention is to provide a method of and an apparatus for cleaning a magnetic recording disk cartridge to clear the magnetic recording disk cartridge of dust such as the particulate components of the liner adhering to the disk surface, thereby preventing occurrence of drop-out.

In accordance with the method of the present invention, the magnetic recording disk accommodated in the casing is rotated and air in the casing is drawn through air sucking openings formed in the upper and lower sides of the casing, whereby dust on the magnetic recording disk such as particulate components of the liner is discharged out of the casing.

The apparatus of the present invention comprises a magnetic recording disk driving means for rotating the magnetic recording disk, and a pair of suction means which are adapted to be respectively opposed to a pair of air sucking openings formed in the upper and lower sides of the casing and suck air in the casing through the openings.

The term "casing" in this specification should be interpreted to include a so-called disk jacket.

It is preferred that the head receiving openings which give the magnetic head access to the magnetic recording disk are used as the air sucking openings.

The performance of the pair of suction means may be such as to suck air at a rate of 0.5 m$^3$/min in total, though this will depend upon the amount of dust on the magnetic recording disk and the like. Further, the cleaning time may be appropriately set according to the amount of dust on the magnetic recording disk and the like, and may be two seconds, for example.

Further, by sucking air in the casing through the sucking openings formed on the both sides of the magnetic recording disk, cleaning can be effected with the disk held in the neutral position without being biased against one of the upper and lower sides of the casing.

DESCRIPTION OF THE PREFERRED EMBODIMENT

Figure 1:
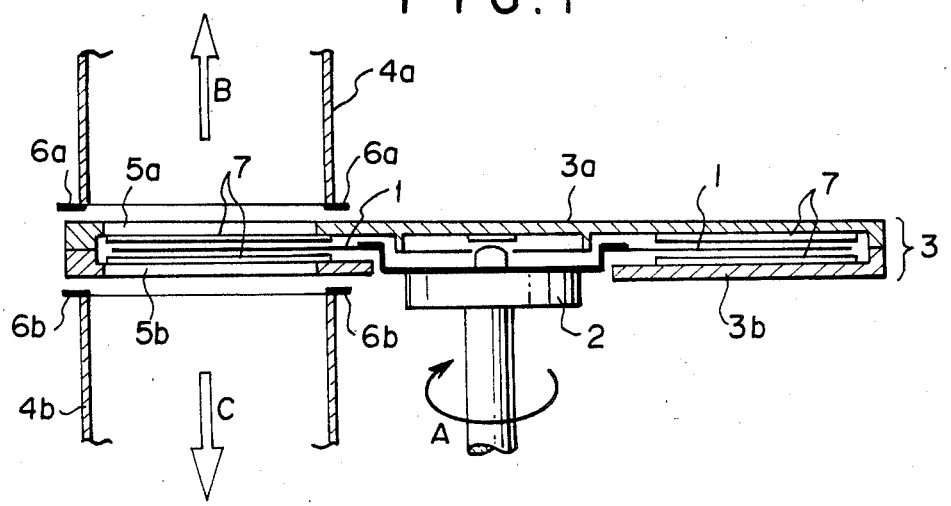
FIG. 1 is a fragmentary cross-sectional view showing an apparatus for cleaning a magnetic recording disk cartridge in accordance with an embodiment of the present invention.

In FIG. 1, a cleaning apparatus in accordance with an embodiment of the present invention comprises a rotating attachment 2 for rotating a magnetic recording disk 1 of a 3.5" micro floppy disk, and a pair of suction nozzles 4a and 4b for sucking air in a casing 3 (in which the magnetic recording disk 1 is accommodated) through a pair of respective magnetic head receiving openings 5a and 5b which are respectively formed in the upper and lower sides 3a and 3b (upper and lower halves of the casing 3) and through which the magnetic head is given access to the magnetic recording disk 1. A pair of stops 6a and 6b position the respective nozzles 4a and 4b with respect to the floppy disk when cleaning the floppy disk.

Each of the magnetic head receiving openings 5a and 5b has a width at least equal to the width of the recording region of the magnetic recording disk 1, and each of the suction nozzles 4a and 4b has a width at least equal to the width of the corresponding magnetic head receiving opening.

When using the apparatus, the floppy disk is cleaned in the following manner. First the floppy disk is set on the rotating attachment 2 with the nozzles 4a and 4b being retracted away from the respective stops 6a and 6b to enlarge the space between the floppy disk and each of the nozzles 4a and 4b, thereby facilitating the locating of the floppy disk. Then the nozzles 4a and 4b are moved toward the floppy disk until they respectively abut against the stops 6a and 6b, where they are opposed to the respective magnetic head receiving openings 5a and 5b of the casing 3. The space between the floppy disk and each of the stops 6a and 6b may be appropriately set taking into account the amount of dust on the disk 1, the cleaning time and the like.

Thereafter, the rotating attachment 2 is driven to rotate the disk 1 in the direction of arrow A, and at the same time, air in the casing 3 is sucked through the nozzles 4a and 4b as indicated at arrows B and C. The nozzles 4a and 4b are connected to a suitable vacuum source (not shown). Preferably the disk 1 is rotated at 400 to 800 rpm and more preferably at 600 rpm. The air sucking rate through the nozzles 4a and 4b is set at about 0.5 m$^3$/min. in total and cleaning is effected for two seconds, for example.

Reference numeral 7 in FIG. 1 denotes a liner bonded to the inner surfaces of the upper and lower halves 3a and 3b of the casing 3. When the upper and lower halves 3a and 3b are welded together by ultrasonic welding, particulate components of the liner 7 can fall from the liner 7 and adhere thereto. The particulate components adhering to the disk surface can cause drop-out upon recording and/or reproduction. By cleaning the disk 1 by the apparatus or the method of the present invention, occurrence of drop-out can be prevented.

Figure 2:
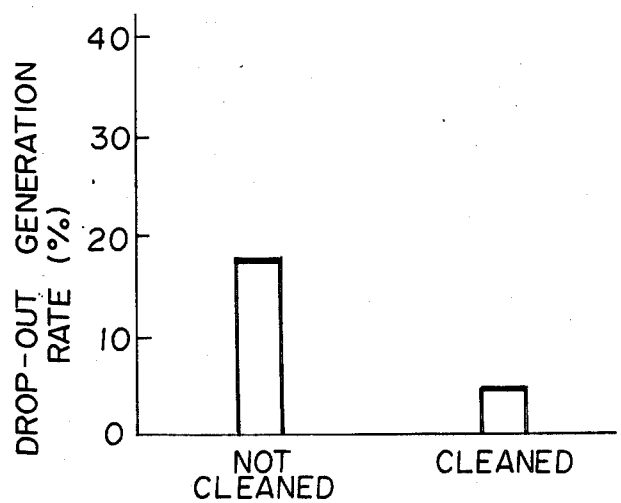
FIG. 2 is a graph showing a result of the invention.

FIG. 2 shows the difference in the drop-out generation rate between the disk cleaned in accordance with the present invention and the disk not cleaned. As can be understood from FIG. 2, by cleaning the disk in accordance with the present invention, the drop-out generation rate can be reduced to about a quarter. Here drop-out is defined to be a state when square wave signals of 250 KHz are recorded on each track of the disk 1 and the ratio of a minimum output voltage in each track to an average output voltage of the track is lowered below 50%.

Though, in the embodiment described above, the suction nozzles are moved toward the disk after the floppy disk is set onto the rotating attachment, the space between the nozzles may be fixed and the rotating attachment may be arranged to be movable in a diametrical direction of the disk to insert the disk between the nozzles after the disk is set to the rotating attachment.

We claim:

1. A method of cleaning a magnetic recording disk accommodated for rotation in a casing comprising steps of rotating the magnetic recording disk and suctioning air from the casing through air suction openings formed in the upper and lower sides of the casing by applying suction nozzles thereto.

2. A method as defined in claim 1 in which said suction openings are the magnetic head receiving openings formed in the casing to give the magnetic head access to the magnetic recording disk.

3. An apparatus for cleaning a magnetic recording disk accommodated for rotation in a casing comprising a magnetic recording disk driving means for rotating the magnetic recording disk, and a pair of suction nozzles which are adapted to be respectively opposed to a pair of air suction openings formed in upper and lower sides of the which suction air from the casing through the openings.

4. An apparatus as defined in claim 3 in which said suction openings are the magnetic head receiving openings formed in the casing to give the magnetic head access to the magnetic recording disk.

* * * * *